United States Patent
Jhang

(10) Patent No.: US 11,360,853 B2
(45) Date of Patent: Jun. 14, 2022

(54) ACCESS METHOD

(71) Applicant: Silicon Motion, Inc., Jhubei (TW)

(72) Inventor: Yi-Shou Jhang, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 17 days.

(21) Appl. No.: 16/792,892

(22) Filed: Feb. 18, 2020

(65) Prior Publication Data
US 2020/0264949 A1 Aug. 20, 2020

Related U.S. Application Data

(60) Provisional application No. 62/808,273, filed on Feb. 20, 2019.

(51) Int. Cl.
*G06F 3/06* (2006.01)
*G06F 11/10* (2006.01)

(52) U.S. Cl.
CPC .......... *G06F 11/108* (2013.01); *G06F 3/0622* (2013.01); *G06F 3/0658* (2013.01); *G06F 3/0679* (2013.01); *G06F 11/1004* (2013.01); *G06F 11/1044* (2013.01)

(58) Field of Classification Search
CPC .. G06F 11/108; G06F 11/1004; G06F 3/0679; G06F 3/0622; G06F 3/0658; G06F 11/1044; G06F 3/0659; G06F 3/064; G06F 3/061; G06F 12/0607
USPC ........................................................ 714/758
See application file for complete search history.

(56) References Cited

U.S. PATENT DOCUMENTS

| | | | | |
|---|---|---|---|---|
| 9,069,687 B2* | 6/2015 | Dave | ...................... | H03M 13/29 |
| 9,407,289 B2* | 8/2016 | Kim | ...................... | H03M 13/09 |
| 9,432,298 B1* | 8/2016 | Smith | ...................... | H04L 47/34 |
| 10,061,641 B2* | 8/2018 | Kim | .................... | G06F 11/1012 |
| 2009/0083504 A1* | 3/2009 | Belluomini | ......... | G06F 11/1076 711/162 |
| 2009/0086551 A1 | 4/2009 | Ide et al. | | |
| 2010/0023800 A1* | 1/2010 | Harari | ................. | G06F 12/0246 714/2 |
| 2010/0287427 A1* | 11/2010 | Kim | ........................ | G06F 11/08 714/721 |
| 2012/0185749 A1* | 7/2012 | Okada | ................. | G06F 11/1076 714/E11.03 |
| 2012/0192032 A1* | 7/2012 | Iwasaki | ............... | G06F 11/1048 714/758 |
| 2013/0343131 A1* | 12/2013 | Wu | ........................ | G11C 16/26 365/185.24 |
| 2014/0101514 A1* | 4/2014 | Cho | .................... | G06F 11/1076 714/758 |
| 2014/0208007 A1* | 7/2014 | Cohen | ................. | G06F 12/0246 711/103 |

(Continued)

*Primary Examiner* — Albert Decady
*Assistant Examiner* — Enam Ahmed

(57) ABSTRACT

An access method is provided, which is applied to a memory device. The memory device is coupled to a host device, the host device is configured to provide a data, the memory device includes a SSD controller and a volatile memory, the volatile memory is coupled to the SSD controller, and the volatile memory includes a data storage area. The access method includes: the SSD controller receiving the data, the SSD controller generating a corresponding cyclic redundancy check code according to the data, and the SSD controller sequentially storing the data and the cyclic redundancy check code into the data storage area.

10 Claims, 9 Drawing Sheets

(56) References Cited

U.S. PATENT DOCUMENTS

| | | | |
|---|---|---|---|
| 2015/0135042 A1* | 5/2015 | Im | G06F 11/1008 |
| | | | 714/807 |
| 2018/0039425 A1 | 2/2018 | Li | |
| 2018/0081754 A1* | 3/2018 | Berman | G11C 29/52 |
| 2019/0004895 A1* | 1/2019 | Lee | G11C 14/0045 |

* cited by examiner

ACCESS METHOD

FIELD OF THE INVENTION

The present invention relates to an access method, and more particularly to an access method for efficiently accessing a volatile memory to reduce a number of instructions.

BACKGROUND OF THE INVENTION

Generally speaking, a volatile memory such as a dynamic random access memory (DRAM) is used as a temporary storage space for temporarily storing data before a host device writes the data into the flash memory. However, in order to ensure the correctness of the data, a cyclic redundancy check code is additionally added to check the correctness of the data based on the original data, or an error correcting code is additionally added to correct errors of the data. These greatly increase an amount of additional data and instructions for accessing the volatile memory, which leads to a significant reduction in the throughput of the DRAM, which causes the overall system performance to decline. Therefore, how to provide a method to protect the data by using the same number of cyclic redundancy check codes and error-correcting codes, and to improve the throughput of the DRAM by reducing the number of access instructions, will be a focus to be solved in the art.

SUMMARY OF THE INVENTION

In view of this, embodiments of the present invention provide an access method applied to a memory device. The memory device is coupled to a host device, the host device is configured to provide a data, the memory device includes a solid state drive (SSD) controller and a volatile memory, the volatile memory is coupled to the SSD controller, and the volatile memory includes a data storage area and a check code storage area. The access method includes: the SSD controller receiving the data; the SSD controller generating a corresponding cyclic redundancy check code according to the data; the SSD controller storing the data into the data storage area; and the SSD controller storing the cyclic redundancy check code into the check code storage area.

In an embodiment of the present invention, the memory device further includes a cyclic redundancy check code generator, and the cyclic redundancy check code generator is coupled to the SSD controller. A step of the SSD controller generating the corresponding cyclic redundancy check code according to the data further includes: the SSD controller transmitting the data to the cyclic redundancy check code generator to generate the cyclic redundancy check code corresponding to the data.

The embodiments of the present invention provide another access method applied to a memory device. The memory device is coupled to a host device, the host device is configured to provide a data, the memory device includes a solid state drive (SSD) controller and a volatile memory, the volatile memory is coupled to the SSD controller, and the volatile memory includes a data storage area. The access method includes: the SSD controller receiving the data; the SSD controller generating a corresponding cyclic redundancy check code according to the data; and the SSD controller sequentially storing the data and the cyclic redundancy check code into the data storage area.

In an embodiment of the present invention, the memory device further includes a cyclic redundancy check code generator, and the cyclic redundancy check code generator is coupled to the SSD controller. A step of the SSD controller generating the corresponding cyclic redundancy check code according to the data further includes: the SSD controller transmitting the data to the cyclic redundancy check code generator to generate the cyclic redundancy check code corresponding to the data.

The embodiments of the present invention provide another access method applied to a memory device. The memory device is coupled to a host device, the host device is configured to provide a data, the memory device includes a solid state drive (SSD) controller and a volatile memory, the volatile memory is coupled to the SSD controller, and the volatile memory includes a data storage area. The access method includes: the SSD controller receiving the data and dividing the data to a plurality of sub-data according to a preset size; the SSD controller generating a corresponding cyclic redundancy check code according to the data; the SSD controller generating a corresponding sub-error-correcting code according to each of the plurality of sub-data; the SSD controller alternately storing each of the plurality of sub-data and its corresponding sub-error-correcting code into the data storage area; and the SSD controller storing the cyclic redundancy check code corresponding to the data into the data storage area.

In an embodiment of the present invention, the memory device further includes an error-correcting code generator, and the error-correcting code generator is coupled to the SSD controller. A step of the SSD controller generating the corresponding sub-error-correcting code according to each of the plurality of sub-data further includes: the SSD controller transmitting each of the plurality of sub-data to the error-correcting code generator to generate the sub-error-correcting code corresponding to each of the plurality of sub-data.

In an embodiment of the present invention, the memory device further includes a cyclic redundancy check code generator, and the cyclic redundancy check code generator is coupled to the SSD controller. A step of the SSD controller generating the corresponding cyclic redundancy check code according to the data further includes: the SSD controller transmitting the data to the cyclic redundancy check code generator to generate the cyclic redundancy check code corresponding to the data.

The embodiments of the present invention provide another access method applied to a memory device. The memory device is coupled to a host device, the host device is configured to provide a plurality of data, the memory device includes a solid state drive (SSD) controller and a volatile memory, the volatile memory is coupled to the SSD controller, and the volatile memory includes a data storage area. The access method includes: the SSD controller receiving the plurality of data; the SSD controller generating a corresponding cyclic redundancy check code according to each of the plurality of data; the SSD controller generating an error-correcting code according to the plurality of data and their corresponding cyclic redundancy check codes; the SSD controller alternately storing the plurality of data and their corresponding cyclic redundancy check codes into the data storage area; and the SSD controller storing the error correcting code into the data storage area.

In an embodiment of the present invention, the memory device further includes a cyclic redundancy check code generator, and the cyclic redundancy check code generator is coupled to the SSD controller. A step of the SSD controller generating the corresponding cyclic redundancy check code according to each of the plurality of data further includes: the SSD controller transmitting each of the plurality of data to the cyclic redundancy check code generator to generate the cyclic redundancy check code corresponding to each of the plurality of data.

In an embodiment of the present invention, the memory device further includes an error-correcting code generator, and the error-correcting code generator is coupled to the SSD controller. A step of the SSD controller generating the error-correcting code according to the plurality of data and their corresponding cyclic redundancy check codes further includes: the SSD controller transmitting each of the plurality of data and its corresponding cyclic redundancy check code to the error-correcting code generator to generate the error-correcting code corresponding to each of the plurality of data and its corresponding cyclic redundancy check code.

In the access method is provided by the embodiments of the present invention, when accessing the volatile memory, the SSD controller sequentially or alternately stores the received data and the corresponding cyclic redundancy check code/the corresponding error-correcting code to the data storage area to avoid frequently replacing row address in access, so as to reduce the number of the instructions used in replacing row in access, thereby improving the throughput of the volatile memory and the efficiency of data access, and improving the performance of the overall system throughput.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

An access method provided by embodiments of the present invention can be applied to a desktop computer, a notebook computer, an industrial computer, or other electronic products that use a volatile memory internally. The volatile memory may be, for example, a dynamic random access memory (DRAM) or a synchronous dynamic random access memory (SDRAM). In the embodiment of the present invention, the volatile memory can be used as a temporary storage space before a host device writes data into the flash memory (FLASH).

Figure 1:
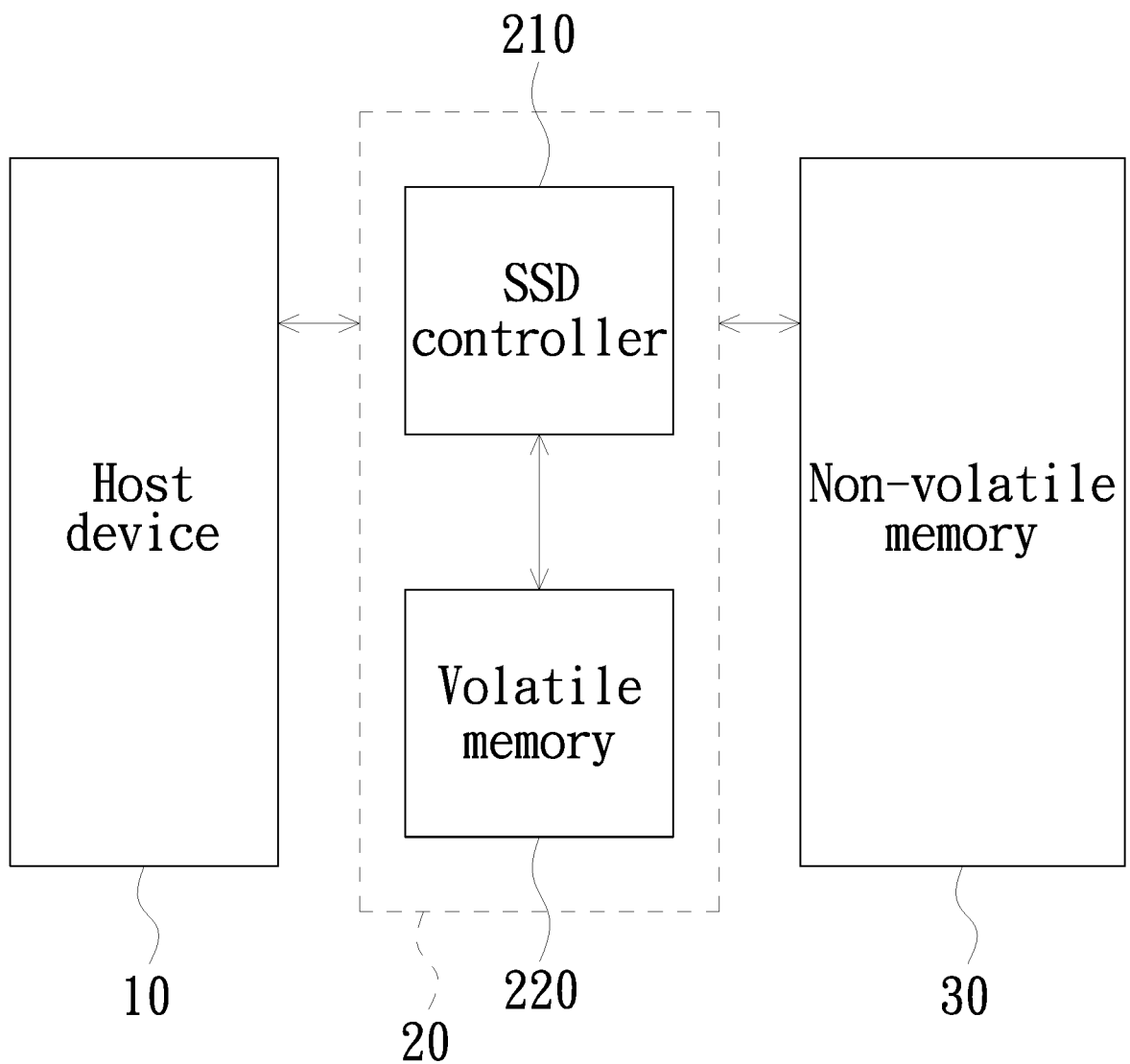
FIG. 1 is a system architecture schematic diagram of an access method provided by an embodiment of the present invention.

Please refer to FIG. 1, which is a system architecture schematic diagram of an access method provided by an embodiment of the present invention. The system architecture 1 includes a host device 10, a memory device 20 and a non-volatile memory 30. The memory device 20 is coupled to the host device 10. The memory device 20 includes a solid state drive (SSD) controller 210 and a volatile memory 220. The volatile memory 220 includes a data storage area 221 and a check code storage area 222. In addition, the system architecture 1 further includes a check code generator (not shown), which is coupled to the SSD controller 210. Furthermore, the SSD controller 210 may transmit the data to the check code generator to generate a check code corresponding to the data. In addition, the system architecture 1 may further include a correcting code generator (not shown), which is coupled to the SSD controller 210. Furthermore, the SSD controller 210 may transmit each of data to the correcting code generator to generate a correcting code corresponding to each of data. The SSD controller 210 may transmit each of data and its corresponding check code to the correcting code generator to generate a correcting code corresponding to each of data and its corresponding check code. In addition, the host device 10 is used to provide a plurality of data packets to the volatile memory 220. The volatile memory 220 is used as a temporary storage space before the host device 10 writes the data packets into the non-volatile memory 30. The host device 10 may be a central processing unit (CPU) in a computer, the memory device 20 may be a storage device in the computer, the SSD controller 210 may be a microprocessor or a special application integrated circuit in the storage device, a volatile memory 220 may be a DRAM, and the non-volatile memory 30 may be a flash memory. Generally speaking, the volatile memory 220 is an array composited of M*N memory cells, and each memory cell stores at least one bit of information. For example, the data storage area 221 of the volatile memory 220 has M columns and N rows, and the check code storage area 222 of the volatile memory 220 has S columns and N rows, where M, S, and N all are positive integers greater than or equal to 2. Furthermore, the storage space of the data storage area 221 ranges from a first column to a $M^{th}$ column, and the storage space of the check code storage area 222 ranges from a $(M+1)^{th}$ column to a $(M+S)^{th}$ column.

The embodiments of the present invention can have different access methods according to different demands. They can be divided into two types. The first type of access method is to respectively access the data and a cyclic redundancy check code (CRC)/an Error-Correcting Code (ECC) based on two start addresses. Furthermore, when writing the data into the DRAM, the CRC is written at the same time, and then the CRC can be used to check the correctness of the data. The data and the CRC can be stored in different storage spaces in the DRAM (that is, the storage space is divided according to different start addresses), so that the data and the CRC are stored separately and alternately in two preset storage spaces in the DRAM.

Figure 2:
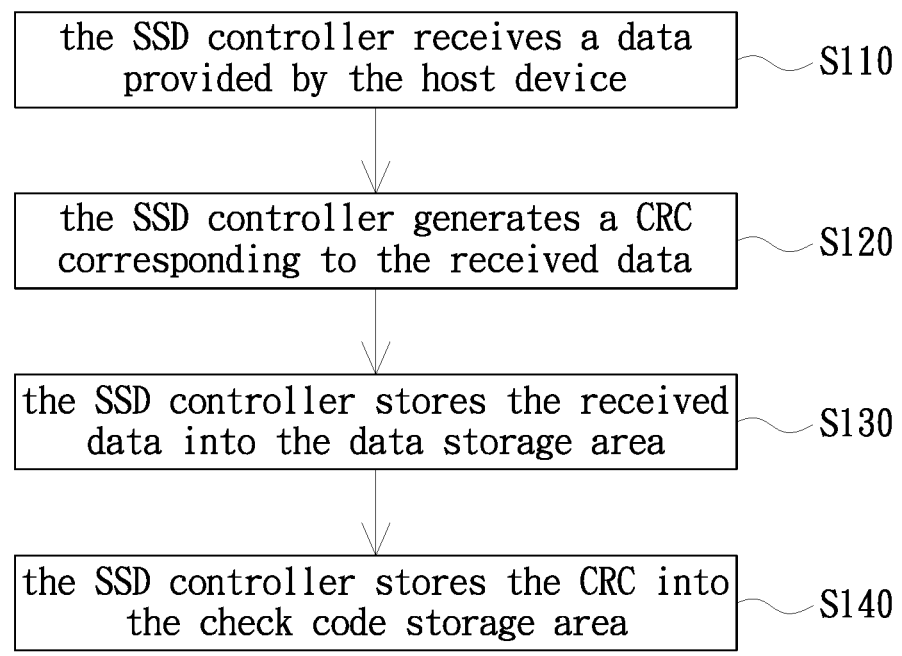
FIG. 2 is a flow chart of an access process based on two start addresses provided by an embodiment of the present invention.

FIG. 2 is a flow chart of an access process based on two start addresses provided by an embodiment of the present invention. The access method of the embodiment of the present invention includes following steps. In step S110: the SSD controller 210 receives a data, such as D1, provided by the host device 10. Next, in step S120: the SSD controller 210 generates a CRC corresponding to the received data. The SSD controller 210 transmits the received data to a built-in CRC generator (not shown) to generate a corresponding CRC, such as CRC1. Then, in step S130, the SSD controller 210 stores the received data into the data storage area 221. In step S140, the SSD controller 210 stores the CRC into the check code storage area 222, where the data storage area 221 and the check code storage area 222 are located in different row addresses of the DRAM.

Figure 3:
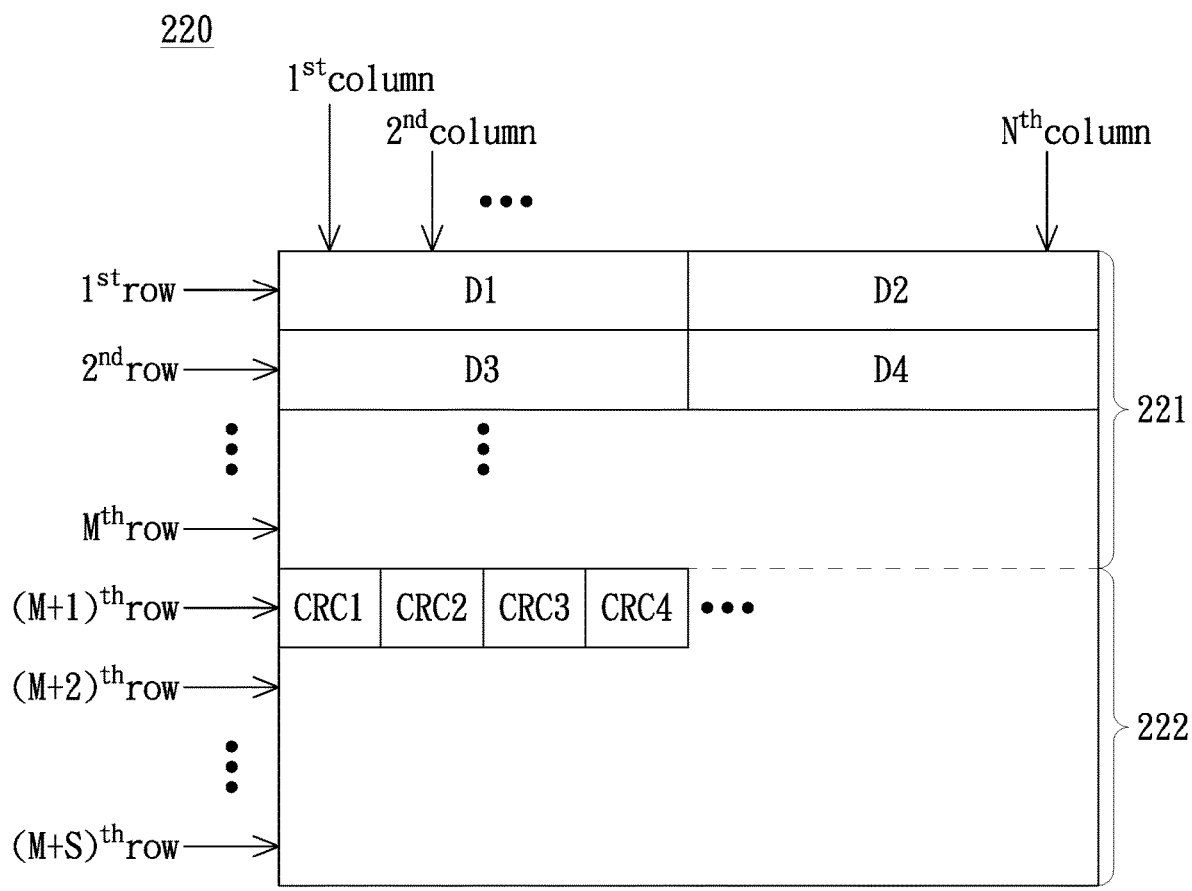
FIG. 3 is a schematic diagram of an access method provided by an embodiment of the present invention.

FIG. 3 is a schematic diagram of an access method provided by an embodiment of the present invention. After the access method of the embodiment of the present invention is executed four times, the SSD controller 210 receives four data, labeled D1, D2, D3, and D4, and sequentially stores D1 to D4 into the data storage area 221. In addition, the built-in CRC generator generates four CRCs, labeled CRC1, CRC2, CRC3, and CRC4, according to the four data, and the SSD controller 210 stores the CRC1 to CRC4 into the check code storage area 222 sequentially.

However, the access method of the embodiment of the present invention has a disadvantage that the efficiency of data access is low. When the SSD controller 210 accesses the data at different row addresses in the same memory block (Bank), the SSD controller 210 must execute a PRECHARGE instruction (hereinafter referred to as the PREA instruction) before executing an ACTIVE instruction (hereinafter referred to as the ACT instruction), and then a WRITE instruction (hereinafter referred to as the WR instruction) or a READ instruction (hereinafter referred to as the RD instruction) can be executed to access a certain column and a certain row of the Bank, so as to meet DRAM operation specifications. The PREA instruction mentioned above carries at least bank address parameters, the ACT instruction carries at least the bank address parameters and row address parameters, and the WR instruction or the RD instruction carries at least column address parameters.

Assuming that the data storage amount of the data storage area 221 is 64 KB (Kilobyte), a data length of each row is 1024 B (Byte), and a size of a data is 512 B, the data storage area 221 can store 128 data. The data storage amount of the check code storage area 222 is 4 KB, a size of a CRC is 32 B, and the check code storage area 222 can store 128 CRCs. Because the data storage amount of a row address is 1 KB, when an amount of the written data exceeds 1 KB, the PREA instruction needs to be executed to replace the row address. Because the data and the CRC are stored alternately in the data storage area 221 and the check code storage area 222. That is, after the received data is stored in the data storage area 221, the SSD controller 210 usually has to execute the PREA instruction to store the CRC to the check code storage area 222, and after the CRC is stored in the check code storage area 222, the SSD controller 210 usually has to execute the PREA instruction to store the next received data in the data storage area 221, and so on, which will cause inefficient data storage in the DRAM.

In short, although the data packets and check code packets stored separately can be easily classified, and the access addresses can also be calculated easily, but the PREA instruction and ACT instruction are used to access when changing rows every time. As a result, the number of additional instructions is increased, which greatly reduces the throughput of the volatile memory 220 and reduces the efficiency of data access.

In order to avoid the disadvantage of the first type of access methods, the present invention further discloses a second type of access methods. In the second type of access methods, the SSD controller 210 accesses the data and the CRC/ECC based on the same start address. Furthermore, the second type of access methods can be divided into three implementations. The first implementation is to store the data and the CRC adjacently in the DRAM. The second implementation is to store N data and N ECCs adjacently in the DRAM, and then store a CRC corresponding to the N data and the N ECCs, where N is, for example, 8. The third implementation is to store N data and N CRCs adjacently in the DRAM, and then store an ECC to protect the N data and the N CRCs, where N is, for example, 8.

Figure 4:
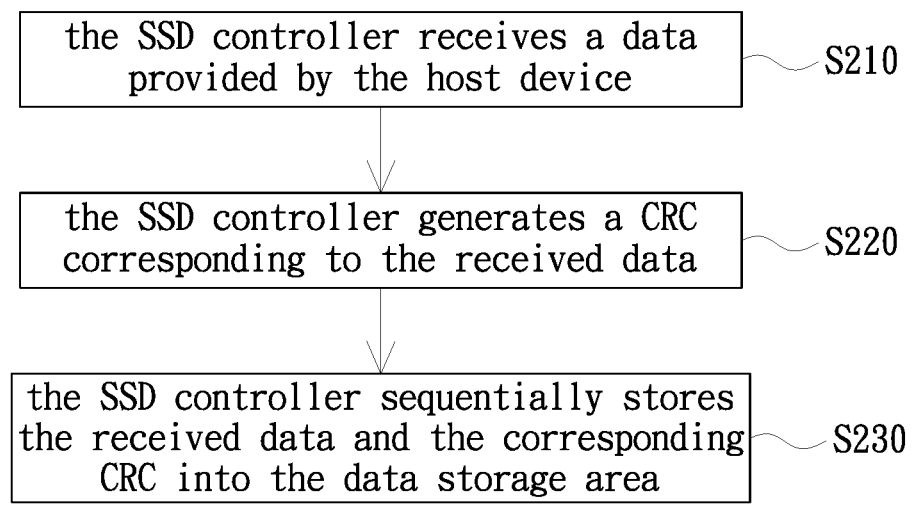
FIG. 4 is a flow chart of a first implementation in accordance with an access method of the present invention.

FIG. 4 is a flow chart of a first implementation in accordance with an access method of the present invention. In step S210, the SSD controller 210 receives a data, such as D1, provided by the host device 10. Next, in step S220, the SSD controller 210 generates a CRC corresponding to the received data. The SSD controller 210 transmits the received data to a built-in CRC generator to generate a corresponding CRC (for example, the CRC1 corresponding to the data D1). Then, in step S230, the SSD controller 210 sequentially stores the received data and the corresponding CRC into the data storage area 221, where the data and the corresponding CRC are stored adjacently in the data storage area 221. A storage of previous and next data, such as D1 and D2, will only execute the PREA instruction at most once; a storage of previous and next CRCs, such as CRC1 and CRC2, will only execute the PREA instruction at most once.

Figure 5:
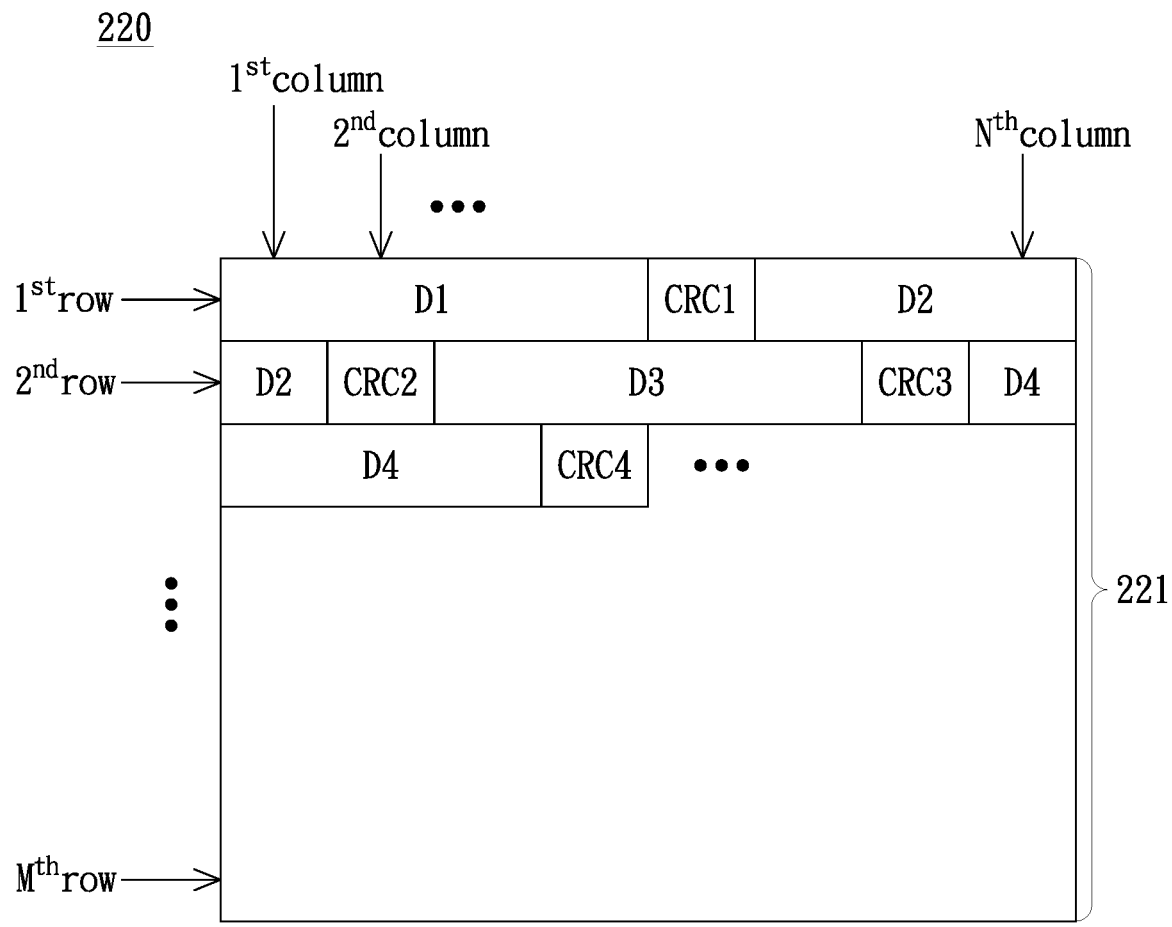
FIG. 5 is a schematic diagram of a first implementation in accordance with an access method of the present invention.

FIG. 5 is a schematic diagram of a first implementation in accordance with an access method of the present invention. The first implementation of the access method of the present invention is executed a total of four times. The SSD controller 210 receives four data, labeled D1, D2, D3, and D4, and generates four CRCs, labeled CRC1, CRC2, CRC3, and CRC4 according to the four data through the built-in CRC generator. The SSD controller 210 stores the data D1 and the CRC1 to data storage area 221 first, then stores the data D2 and the CRC2 to data storage area 221, and so on, until the data D3, the CRC3, the data D4 and the CRC4 are stored in the data storage area 221.

Assuming that the storage data amount of the data storage area 221 is 17 KB, a data length of each row is 1 KB, a size of a data is 512 B, and a size of a CRC is 32 B. Therefore, the data storage area 221 can store 32 data and 32 CRCs. Because the storage data amount of a row address is 1 KB, and the size of the data D1 and the CRC1 is only 544 B, the SSD controller 210 stores the data D1 and the CRC1 to the data storage area 221 without executing the PREA instruction for a replacement of the row address. Only when the SSD controller 210 stores the data D2 to the data storage area 221, the PREA instruction needs to be executed once. In addition, the SSD controller 210 stores the CRC2, the data D3, and the CRC3 to the data storage area 221 without executing the PREA instruction. It can be known from the above that during a process of storing data and corresponding CRCs into the data storage area 221, a number of executions of the PREA instruction can be effectively reduced, so that the efficiency of data access in DRAM can be improved.

Figure 6:
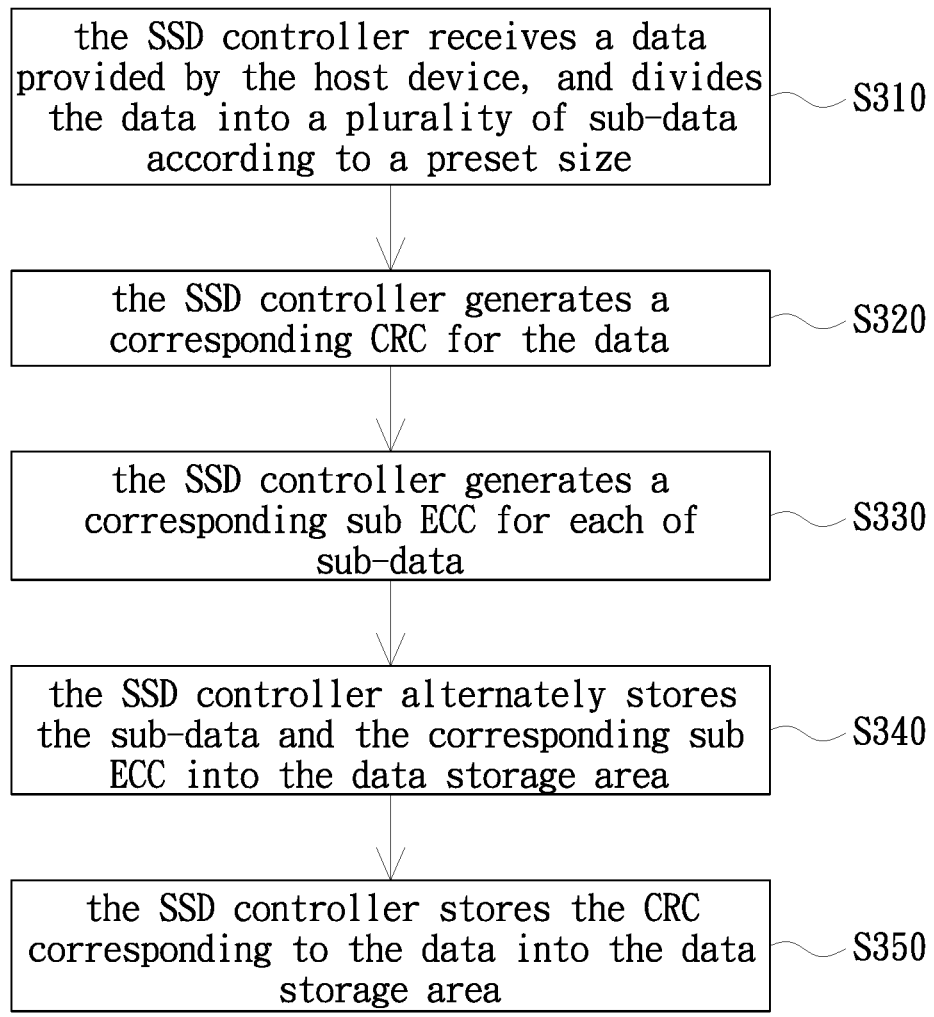
FIG. 6 is a flow chart of a second implementation in accordance with an access method of the present invention.

FIG. 6 is a flow chart of a second implementation in accordance with an access method of the present invention. In step S310, the SSD controller 210 receives a data, such as D1, provided by the host device 10, and divides the data into a plurality of sub-data according to a preset size. Assuming that the size of the data D1 is 512 B and the preset size is 32 B, the data D1 can be divided into 16 sub-data, labeled SD1 to SD16.

In step S320, the SSD controller 210 generates a corresponding CRC for the data. For example, the SSD controller 210 generates a CRC1 corresponding to the data D1.

In step S330, the SSD controller 210 generates a corresponding sub ECC for each of sub-data. The SSD controller 210 generates sub-error-correcting codes (sub ECCs), which are labeled SECC1 to SECC16, corresponding to the sub-data SD1 to SD16 through a built-in error-correcting code generator. The size of each sub ECC is, for example, 2 B. The sub ECC can be configured to correct an error bit of the sub-data SD, an error bit correcting capability of the sub ECC is, for example, 1 bit, which means that the sub ECC1 can be used to correct 1 error bit in the sub-data SD1.

In step S340, the SSD controller 210 alternately stores the sub-data SD and the corresponding sub ECC into the data storage area 221. For example, the SSD controller 210 stores the sub-data SD1 and the corresponding SECC1 to the data storage area 221, then stores the sub-data SD2 and the corresponding SECC2 to the data storage area 221, and then stores the sub-data SD3 and the corresponding SECC3 to the data storage area 221, and so on, until the sub-data SD16 and the corresponding SECC16 are stored in the data storage area 221.

In step S350, the SSD controller 210 stores the CRC corresponding to the data into the data storage area 221. The SSD controller 210 stores the CRC1 corresponding to the data D1 to the data storage area 221, and the CRC1 is stored behind the SECC16. In addition, in order to ensure the correctness of the CRC1, the SSD controller 210 may generate a ECC1 corresponding to the CRC1. In addition, a storage of previous and next data, such as D1 and D2, will only execute the PREA instruction at most once; a storage of previous and next CRCs, such as CRC1 and CRC2, will only execute the PREA instruction at most once.

Figure 7:
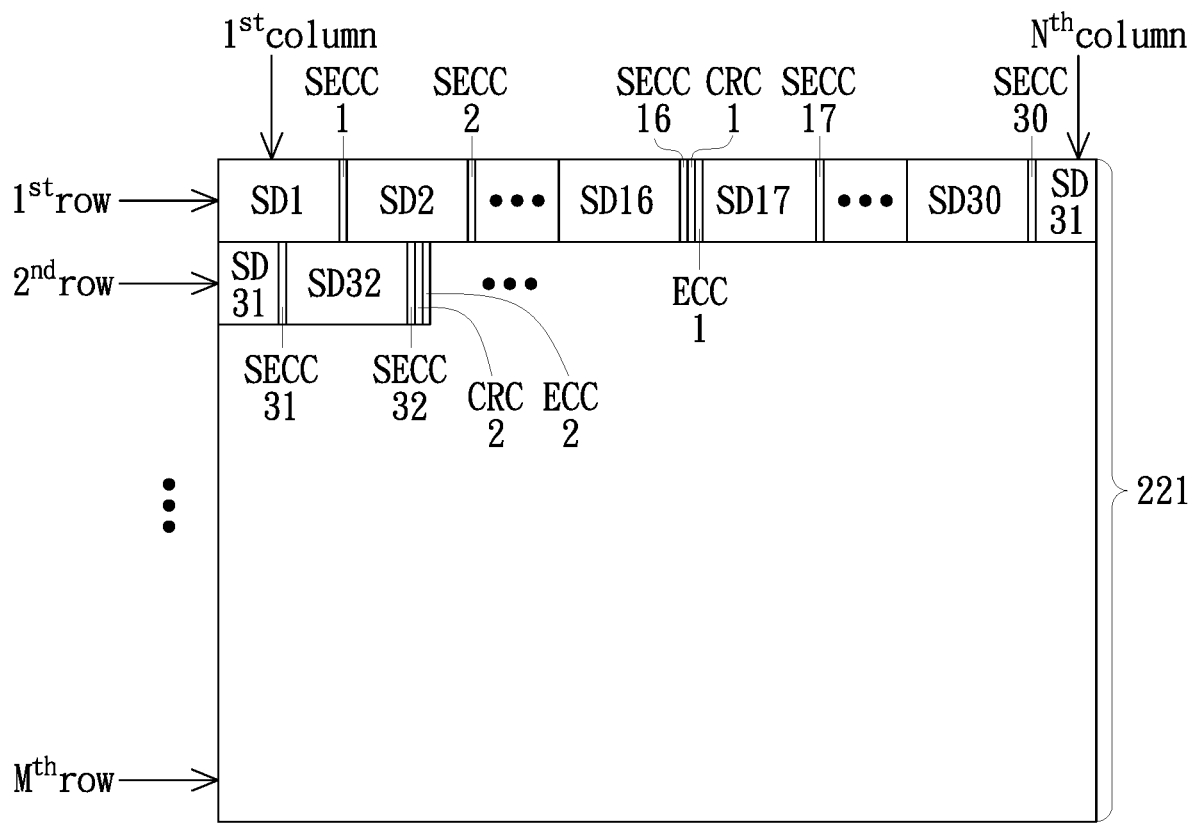
FIG. 7 is a schematic diagram of a second implementation in accordance with an access method of the present invention.

Assuming that a data length of each row is 1 KB, a size of a sub-data SD is 32 B, a size of a sub SECC is 2 B, a size of a CRC is 32 B, and a size of an ECC is 2 B. Therefore, although the size of the data D1 is only 512 B, the SSD controller 210 stores a total data amount of 578 B (=34*16+32+2) of data to the data storage area 221. After the SSD controller 210 stores the data D1 in the data storage area 221, the SSD controller 210 can store the data D2 to the data storage area 221, or store the sub-data SD17 to SD32, SECC17 to SECC32, CRC2, and ECC2 to the data storage area 221. As shown in FIG. 7, which is a schematic diagram of a second implementation in accordance with an access method of the present invention. Since the stored data amount is 578 B, the SSD controller 210 stores the data D1 including SECC, CRC1, and ECC1 to the data storage area 221 without performing PREA. Only when the SSD controller 210 stores the data D2 in the data storage area 221, the PREA instruction needs to be executed once. In addition, the SSD controller 210 stores the CRC2, the ECC2, the data D3 (not shown), the CRC3 (not shown), and the ECC3 (not shown) to the data storage area 221 without executing a PREA instruction. It can be known from the above that during a process of storing the sub-data SD, the sub SECC, the CRC, and the ECC into the data storage area 221, a number of executions of the PREA instruction can be effectively reduced, so the efficiency of data access in DRAM can be improved.

Figure 8:
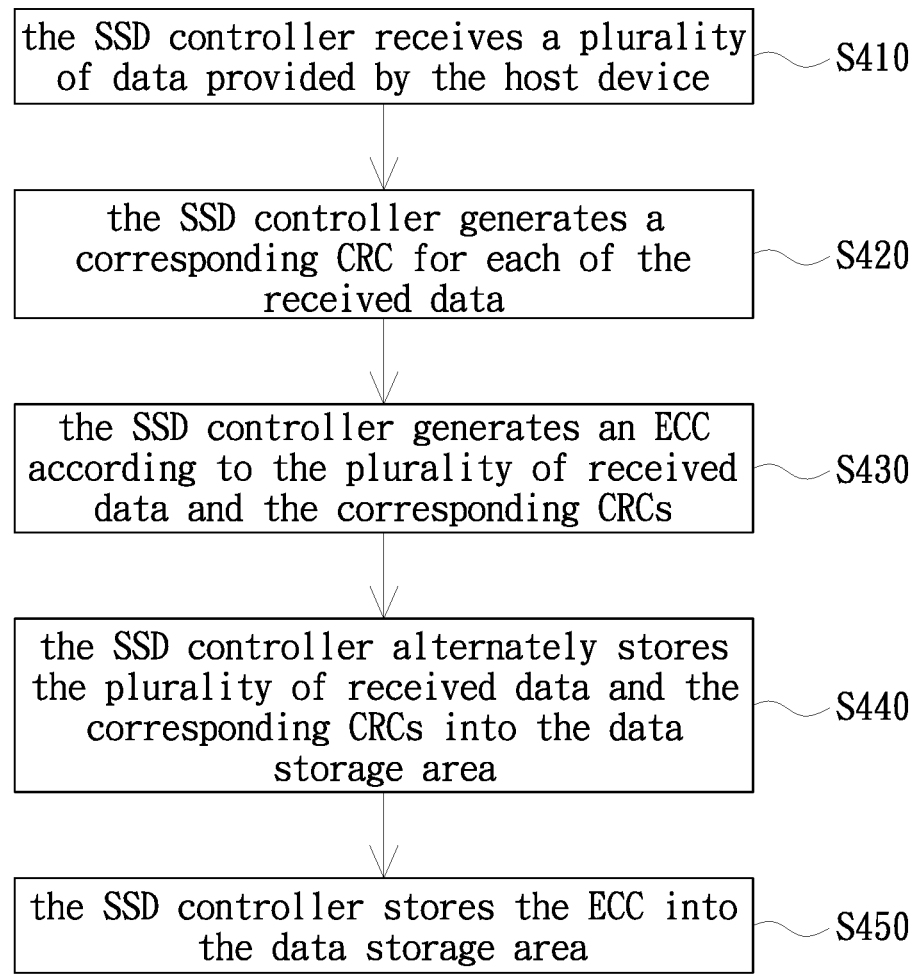
FIG. 8 is a flow chart of a third implementation in accordance with an access method of the present invention.
Figure 9:
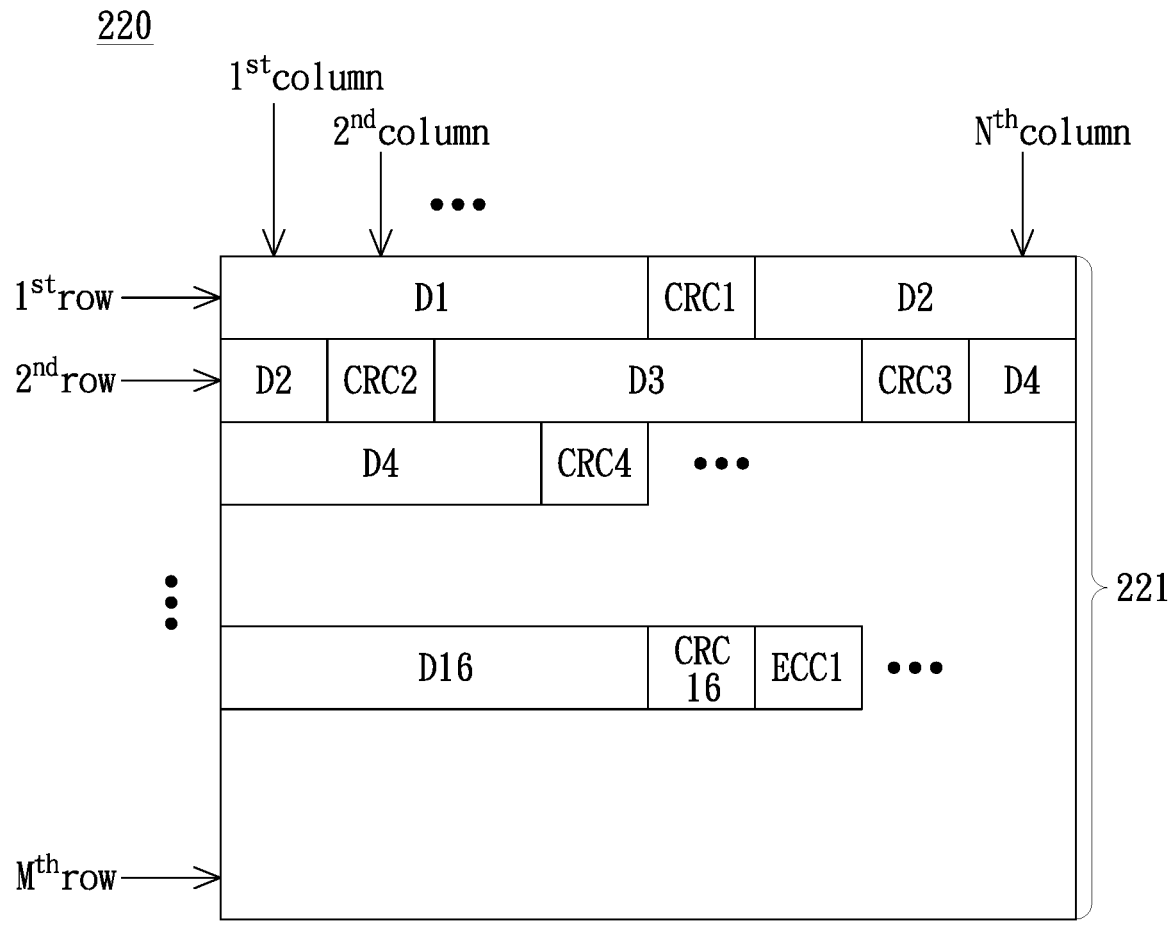
FIG. 9 is a schematic diagram of a third implementation in accordance with an access method of the present invention.

FIG. 8 is a flow chart of a third implementation in accordance with an access method of the present invention. In step S410, the SSD controller 210 receives a plurality of data, such as data D1 to D16, provided by the host device 10. In step S420, the SSD controller 210 generates a corresponding CRC, such as CRC1 to CRC16, for each of the received data. In step S430, the SSD controller 210 generates an ECC, such as ECC1, according to the plurality of received data and the corresponding CRCs. In step S440, the SSD controller 210 alternately stores the plurality of received data and the corresponding CRCs into the data storage area 221. In step S450, the SSD controller 210 stores the ECC into the data storage area 221. As shown in FIG. 9, which a schematic diagram of a third implementation in accordance with an access method of the present invention, where a storage of previous and next data, such as D1 and D2, will only execute the PREA instruction at most once; a storage of previous and next CRCs, such as CRC1 and CRC2, will only execute the PREA instruction at most once.

Assuming that a storage data amount of the data storage area 221 is 18 KB, a data length of each row is 1 KB, a size of a data is 512 B, and a size of a CRC is 32 B. Because the storage data amount of a row address is 1 KB, the size of the data D1 plus the CRC1 is only 544 B, the SSD controller 210 stores the data D1 and the CRC1 to the data storage area 221 without executing the PREA instruction to perform a replacement of the row address. The PREA instruction needs to be executed only once when the SSD controller 210 stores the data D2 to the data storage area 221. In addition, the SSD controller 210 stores the CRC2, the data D3, and the CRC3 to the data storage area 221 without performing PREA instruction. It can be known from the above that during a process of storing the data and the corresponding CRCs into the data storage area 221, a number of executions of the PREA instruction can be effectively reduced, so the efficiency of data access in DRAM can be improved.

In the access method is provided by the embodiments of the present invention, when accessing the volatile memory, the SSD controller sequentially or alternately stores the received data and the corresponding cyclic redundancy check code/the error-correcting code to the data storage area to avoid frequently replacing row address in access, so as to reduce the number of the instructions used in replacing row in access, thereby improving the throughput of the volatile memory, the efficiency of data access, and the performance of the overall system throughput.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. An access method, applied to a memory device, wherein the memory device is coupled to a host device, the host device is configured to provide a data, the memory device includes a solid state drive (SSD) controller and a volatile memory, the volatile memory is coupled to the SSD controller, and the volatile memory includes a data storage area and a check code storage area, the access method comprises:

the SSD controller receiving the data;
the SSD controller generating a corresponding cyclic redundancy check code according to the data; the SSD controller generating a corresponding error-correcting code according to the data and the corresponding cyclic redundancy check code;
the SSD controller storing the data into the data storage area, wherein a PREA instruction needs to be executed once when the SSD controller stores the data to the data storage area, without performing the PREA instruction next time;
the SSD controller storing the cyclic redundancy check code into the check code storage area; and the SSD controller storing the error-correcting code into the check code storage area.

2. The access method as claimed in claim 1, wherein the memory device further includes a cyclic redundancy check code generator, the cyclic redundancy check code generator is coupled to the SSD controller, a step of the SSD controller generating the corresponding cyclic redundancy check code according to the data further includes:
the SSD controller transmitting the data to the cyclic redundancy check code generator to generate the cyclic redundancy check code corresponding to the data.

3. An access method, applied to a memory device, wherein the memory device is coupled to a host device, the host device is configured to provide a data, the memory device includes a solid state drive (SSD) controller and a volatile memory, the volatile memory is coupled to the SSD controller, and the volatile memory includes a data storage area, the access method comprises:
the SSD controller receiving the data;
the SSD controller generating a corresponding cyclic redundancy check code according to the data;
the SSD controller generating a corresponding error-correcting code according to the data and the corresponding cyclic redundancy check code;
the SSD controller sequentially storing the data and the cyclic redundancy check code into the data storage area, wherein a PREA instruction needs to be executed once when the SSD controller stores the data to the data storage area, without performing the PREA instruction next time; and
the SSD controller storing the error-correcting code into the data storage area.

4. The access method as claimed in claim 3, wherein the memory device further includes a cyclic redundancy check code generator, the cyclic redundancy check code generator is coupled to the SSD controller, a step of the SSD controller generating the corresponding cyclic redundancy check code according to the data further includes:
the SSD controller transmitting the data to the cyclic redundancy check code generator to generate the cyclic redundancy check code corresponding to the data.

5. An access method, applied to a memory device, wherein the memory device is coupled to a host device, the host device is configured to provide a data, the memory device includes a solid state drive (SSD) controller and a volatile memory, the volatile memory is coupled to the SSD controller, and the volatile memory includes a data storage area, the access method comprises:
the SSD controller receiving the data and dividing the data to a plurality of sub-data according to a preset size;
the SSD controller generating a corresponding cyclic redundancy check code according to the data;
the SSD controller generating a corresponding sub-error-correcting code according to each of the plurality of sub-data;
the SSD controller alternately storing each of the plurality of sub-data and its corresponding sub-error-correcting code into the data storage area, wherein a PREA instruction needs to be executed once when the SSD controller stores the data to the data storage area, without performing the PREA instruction next time; and
the SSD controller storing the cyclic redundancy check code corresponding to the data into the data storage area.

6. The access method as claimed in claim 5, wherein the memory device further includes an error-correcting code generator, the error-correcting code generator is coupled to the SSD controller, a step of the SSD controller generating the corresponding sub-error-correcting code according to each of the plurality of sub-data further includes:
the SSD controller transmitting each of the plurality of sub-data to the error-correcting code generator to generate the sub-error-correcting code corresponding to each of the plurality of sub-data.

7. The access method as claimed in claim 5, wherein the memory device further includes a cyclic redundancy check code generator, the cyclic redundancy check code generator is coupled to the SSD controller, a step of the SSD controller generating the corresponding cyclic redundancy check code according to the data further includes:
the SSD controller transmitting the data to the cyclic redundancy check code generator to generate the cyclic redundancy check code corresponding to the data.

8. An access method, applied to a memory device, wherein the memory device is coupled to a host device, the host device is configured to provide a plurality of data, the memory device includes a solid state drive (SSD) controller and a volatile memory, the volatile memory is coupled to the SSD controller, and the volatile memory includes a data storage area, the access method comprises:
the SSD controller receiving the plurality of data;
the SSD controller generating a corresponding cyclic redundancy check code according to each of the plurality of data;
the SSD controller generating an error-correcting code according to the plurality of data and their corresponding cyclic redundancy check codes;
the SSD controller alternately storing the plurality of data and their corresponding cyclic redundancy check codes into the data storage area, wherein a PREA instruction needs to be executed once when the SSD controller stores the data to the data storage area, without performing the PREA instruction next time;
and the SSD controller storing the error-correcting code into the data storage area.

9. The access method as claimed in claim 8, wherein the memory device further includes a cyclic redundancy check code generator, the cyclic redundancy check code generator is coupled to the SSD controller, a step of the SSD controller generating the corresponding cyclic redundancy check code according to each of the plurality of data further includes:
the SSD controller transmitting each of the plurality of data to the cyclic redundancy check code generator to generate the cyclic redundancy check code corresponding to each of the plurality of data.

10. The access method as claimed in claim 8, wherein the memory device further includes an error-correcting code generator, the error-correcting code generator is coupled to the SSD controller, a step of the SSD controller generating the error-correcting code according to the plurality of data and their corresponding cyclic redundancy check codes further includes:
the SSD controller transmitting each of the plurality of data and its corresponding cyclic redundancy check code to the error-correcting code generator to generate the error-correcting code corresponding to each of the plurality of data and its corresponding cyclic redundancy check code.

* * * * *